United States Patent [19]

Herbello

[11] 3,844,353
[45] Oct. 29, 1974

[54] FLUID FLOW CONTROL APPARATUS
[75] Inventor: Mario Herbello, St. Louis, Mo.
[73] Assignee: Factory Mutual Research Corporation, Norwood, Mass.
[22] Filed: Feb. 22, 1974
[21] Appl. No.: 445,281

Related U.S. Application Data
[62] Division of Ser. No. 365,206, May 30, 1973, Pat. No. 3,809,112.

[52] U.S. Cl..................... 169/18, 137/236, 251/66
[51] Int. Cl..................... F16k 21/04, A62c 37/06
[58] Field of Search..................... 169/18, 5, 16, 19; 137/236, 517; 251/228, 66, 289

[56] References Cited
UNITED STATES PATENTS

| 570,689 | 11/1896 | Thomas | 169/16 |
|---|---|---|---|
| 1,295,658 | 2/1919 | Widmann | 251/289 X |
| 1,307,450 | 6/1919 | Morton | 251/236 X |
| 3,590,862 | 6/1971 | De Graaf | 137/522 |
| 3,738,430 | 6/1973 | Livingston | 169/16 X |

Primary Examiner—M. Henson Wood
Assistant Examiner—Michael Mar
Attorney, Agent, or Firm—Lane, Aitken, Dunner & Ziems

[57] ABSTRACT

An apparatus for controlling fluid flow through a conduit, including a housing having an inlet and an outlet adapted to register with the conduit. A valve member is disposed in the housing and is operatively connected to an actuator for moving the valve between an open position in which fluid flow is permitted through the housing and a closed position in which fluid flow through the housing is prevented. The valve is normally urged to the open position and the arrangement is such that a continuous manually applied energy input to the apparatus is required to move the valve to the closed position. A fire protection system incorporating the above apparatus.

6 Claims, 6 Drawing Figures

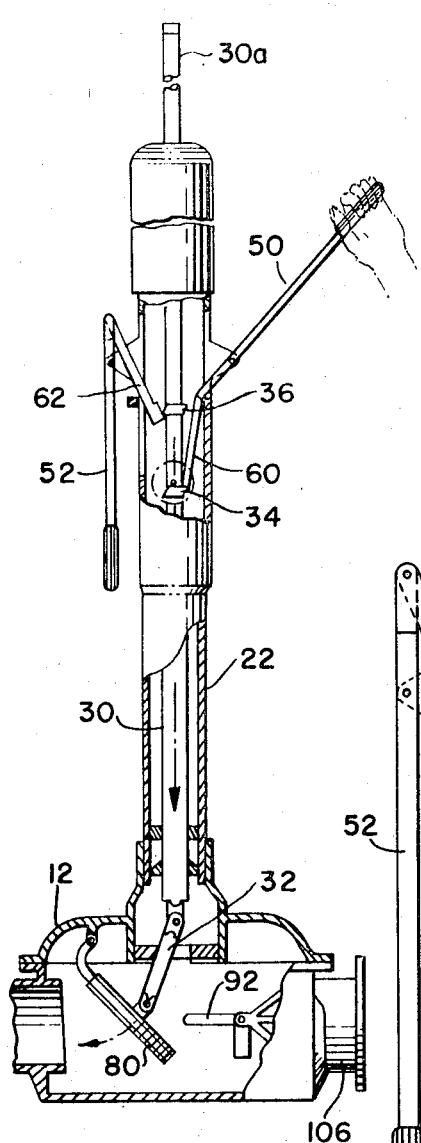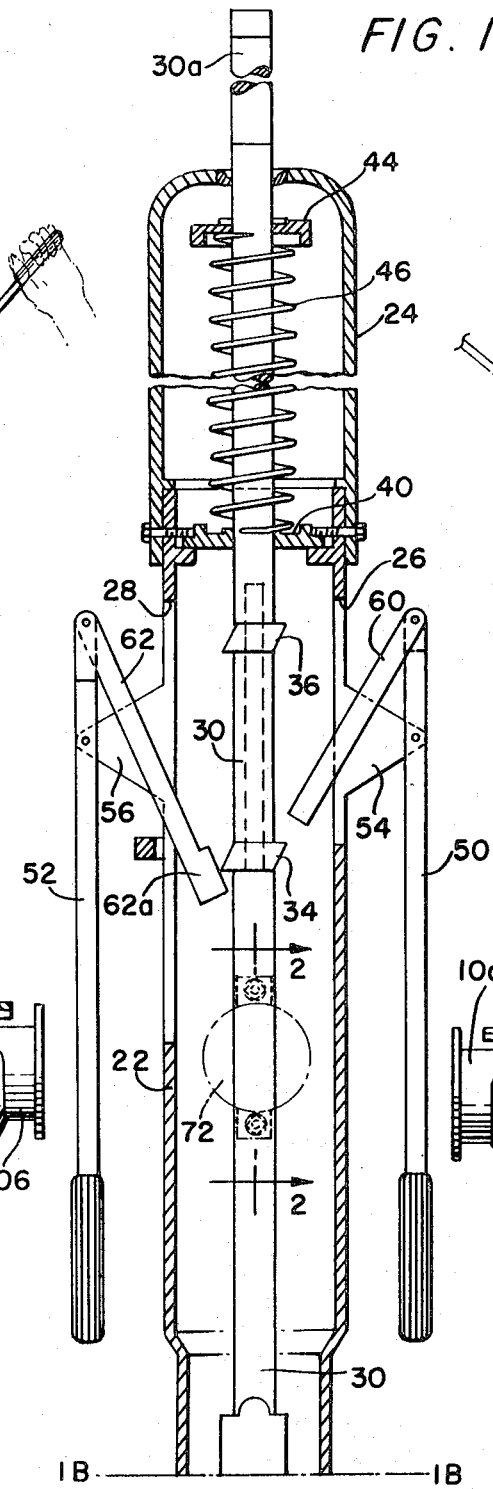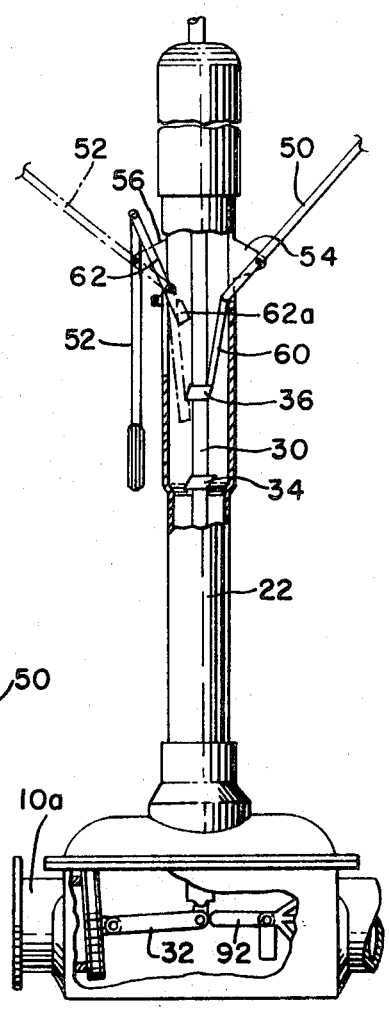

3,844,353

FLUID FLOW CONTROL APPARATUS

CROSS-REFERENCE TO RELATED APPLICATION

This is a division of application Ser. No. 365,206 filed May 30, 1973 now Pat. No. 3,809,112.

BACKGROUND OF THE INVENTION

This invention relates to a fluid flow control apparatus and to a fire protection system incorporating the apparatus, and more particularly, to such an apparatus and system in which the flow of fluid through a supply conduit is controlled.

Several applications exist for an apparatus that controls fluid flow through a conduit in a manner whereby flow is normally permitted through the conduit but must be terminated under certain circumstances. For example, when it is desired to shut off the main water supply to a fire protection system for inspection or maintenance purposes, a manually operable valve is often provided to turn off the water supply to the system. However, the operator responsible for the system often forgets to open the valve after the inspection or maintenance is completed and it is desired to restore the system to its operative state. As a result, when a fire does occur and actuates one or more thermal responsive heads, no water is available to be discharged towards the fire, with obvious disastrous results.

Although attempts have been made to better insure that the operator will open the valve after it has been closed, including the provision of pointers, dials, or the like, associated with the valves, these arrangements simply did not insure that the valve will be reopened.

SUMMARY OF THE INVENTION

It is, therefore, an object of the present invention to provide an apparatus for controlling the flow of fluid through a conduit in which a continuous, manually applied, energy input is required to maintain a valve member in its closed position.

It is a further object of the present invention to provide an apparatus of the above type which insures that the valve member will return to its open position after cessation of the above continuous energy input.

It is a still further object of the present invention to provide a fire protection system incoporating the above apparatus.

Toward the fulfillment of these and other objects, the apparatus of the present invention comprises a housing having inlet and outlet passages registering with said conduit, valve means disposed in said housing, linkage means operatively connected to said valve means for moving same between an open position in which fluid flow is permitted through said housing and a closed position in which fluid flow through said housing is prevented, and resilient means engaging one of said means for normally urging said valve means to said open position to require a continuous manually applied energy input to move said valve means to said closed position.

BRIEF DESCRIPTION OF THE DRAWINGS

FIGS. 1A and 1B together form a longitudinal sectional view of the apparatus of the present invention;

FIGS. 3 and 4 are reduced partial elevational — partial sectional views, similar to FIG. 1, but showing different operational modes of the apparatus of the present invention.

DESCRIPTION OF THE PREFERRED EMBODIMENTS

Figure 1B:
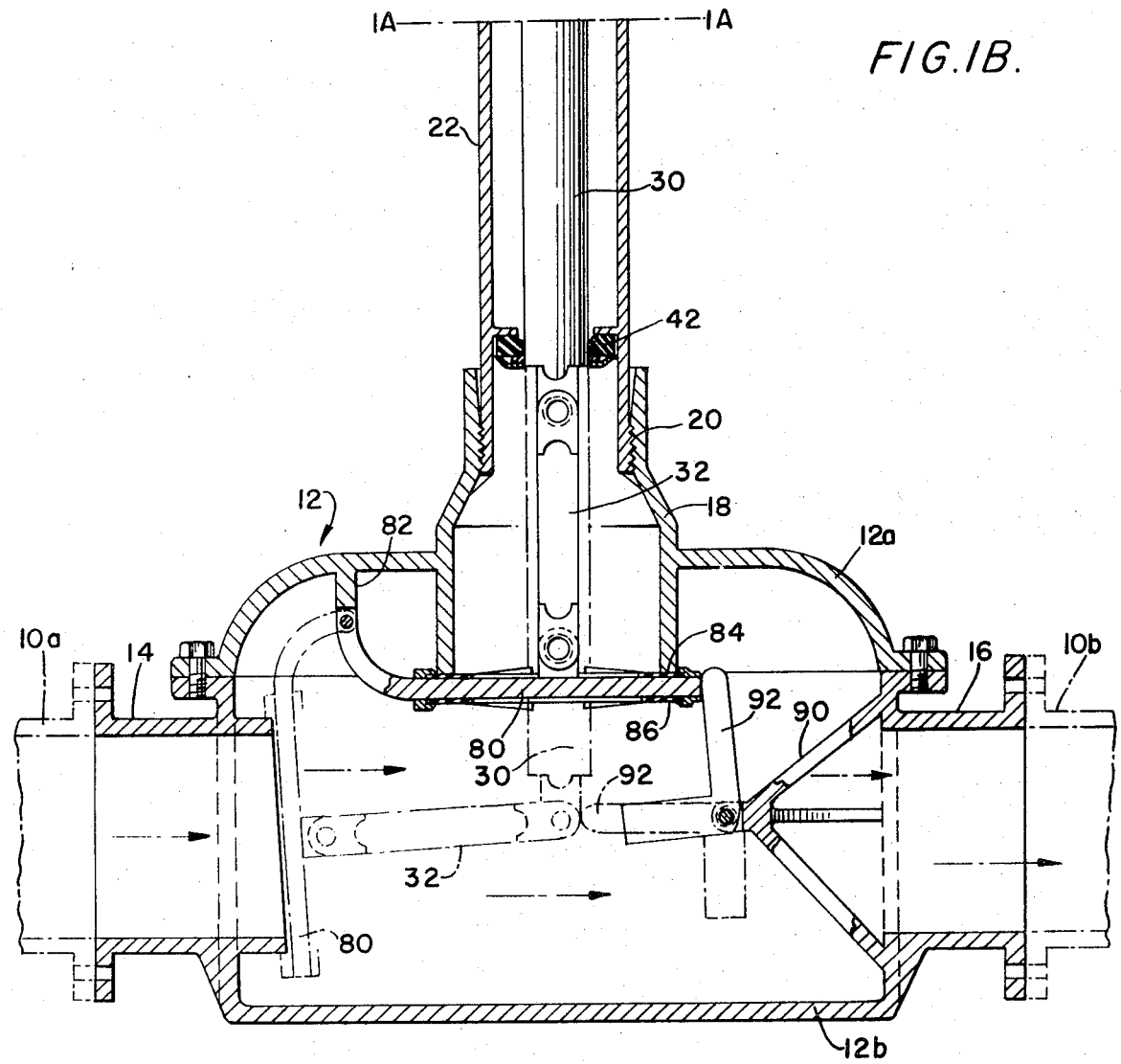

Referring specifically to FIGS. 1A and 1B the reference numerals 10a and 10b refer to two main conduit portions between which the apparatus of the present invention is mounted. In particular, the apparatus of the present invention includes a valve housing 12 formed by an upper portion 12a and a lower portion 12b fastened together by bolts, or the like, extending through cooperating flanges formed on each portion. An inlet conduit 14 and an outlet conduit 16 are formed integral with the housing 12 for receiving and discharging water, respectively. The outer end portions of the conduits 14 and 16 are complementary in size to the corresponding main conduit portions 10a and 10b, respectively, and are adapted to be secured to the latter portions by means of circular flanges formed on the respective portions, as shown. As a result, water from the main conduit 10a normally flows through the housing 12 in the direction indicated by the arrows and exits through the outlet conduit 16.

A cylindrical housing 18 is also formed integral with the housing 12 and extends at right angles to the inlet conduit 14 and the outlet conduit 16. One end portion of the cylindrical housing 18 projects into the housing 12 and defines a valve seat, as will be explained in detail later, while the other end portion is reduced in diameter and is internally threaded as shown at 20. An elongated hollow cylindrical housing 22 has one end portion in threaded engagement with the housing 18 and the other end portion covered by a cap member 24. A pair of openings, or slots, 26 and 28 are formed through the housing 22 for reasons that will be described later.

An elongated actuating rod 30 extends for the full length of the cylindrical housing 22 and has a link 32 pivotally connected to its lower end, as viewed in FIG. 1B, with its other end projecting out from the upper portion of the cap member 24 in the position of the rod 30 shown in FIGS. 1A and 1B. A pair of spaced, circular cams 34 and 36, each having a tapered outer surface, are formed integral with the rod 30 for reasons to be described in detail later.

The rod 30 is supported for axial movement relative to the housing 22 by means of a plate 40 and a seal ring 42 supported relative to the inner surface of the housing 22 near the upper and lower ends thereof, respectively.

A plate 44 is affixed to the rod 30 near the upper end portion thereof and receives a spring 46 which extends between the latter plate and teh plate 40 for urging the rod 30 in an upward direction as viewed in FIGS. 1A and 1B.

A pair of actuating handles 50 and 52 are pivotally mounted relative to the housing 22 about a pair of yokes extending from the housing, with a portion of each yoke being shown by the reference numerals 54 and 56. A pair of camming levers 60 and 62 are pivotally mounted to the handles 50 and 52, respectively, and extend through the openings 26 and 28, respectively, formed in the housing 22. The camming levers 60 and 62 are identical, with the exception that the lever 62 has an enlarged portion 62a formed on its free end for reasons that will be explained in detail later. It can be appreciated from a view of FIG. 1A that movement of the handles 50 and 52 upwardly will cause the levers 60 and 62 to engage the cams 34 and 36 to effect movement of the rod 30 downwardly as will be more specifically described later.

Figure 2:
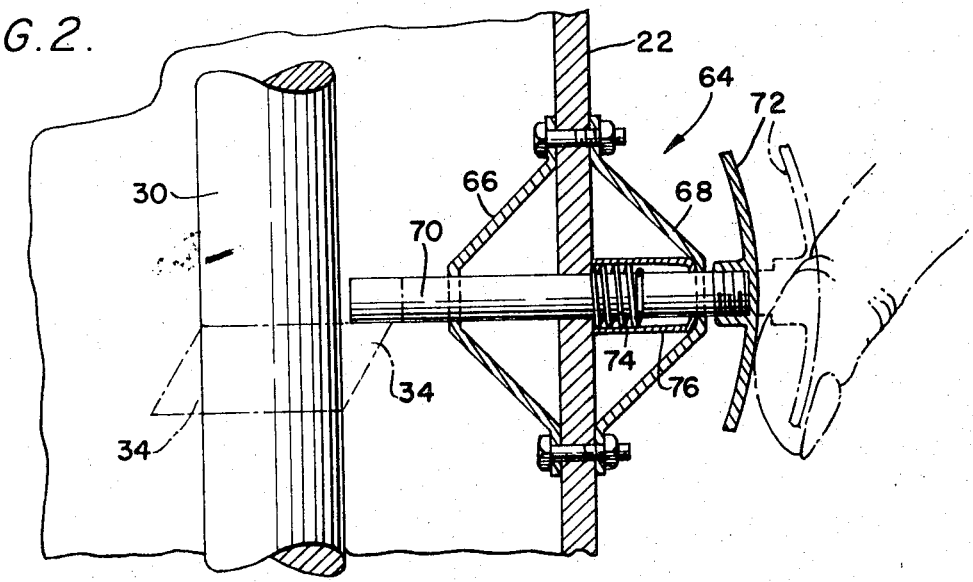
FIG. 2 is a cross-sectional view taken along the line 2—2 of FIG. 1A.

Referring to FIG. 2, a push button assembly, shown in general by the reference numeral 64, is mounted through one wall portion of the cylindrical housing 22. The assembly 64 comprises a pair of support brackets 66 and 68 which support a rod 70 for slidable movement relative thereto. An actuating button 72 is affixed to one end of the rod 70, and a compression spring 74 extends around the rod 70 and within a sleeve 76 connected to the support bracket 68. The spring 74 is affixed to the rod 70 so that, when the button 72 is pushed inwardly, or in a direction from right to left as viewed in FIG. 2, the spring will be compressed so that, when the button is released, it will urge the rod and therefore the button in the opposite direction. It is noted that movement of the button 72 from right to left causes the other end of the rod 70 to move from a position spaced from the actuating rod 30 to a position immediately adjacent the rod for reasons that will be explained in detail later.

Referring again to FIG. 1B, a valve member 80 is pivotally mounted relative to a boss 82 formed on the inner wall of the housing 12 and is thus adapted to move between a position shown by the solid lines in FIG. 1B whereby it engages the end of the cylinder 18, to a position shown by the dashed lines whereby it engages the inner end of the inlet conduit 14 to block the flow of water through the housing 12. The link 32 is pivotally mounted to the valve member 80 to control the above movement in response to movement of the actuating rod 30. The valve member 80 is of a circular shape and has a pair of resilient rings 84 and 86 clamped to its opposite faces for engaging the end of the cylinder 18 and the end of the inlet conduit 14, respectively.

A support assembly 90 is formed integrally with the inner wall of the housing 12 and supports a thrust rod 92 for pivotal movement. In the position of the valve member 80 indicated by the solid lines in FIG. 1B, the thrust rod 92 rests against the edge portion of the valve member.

When left unattended, the assembly including the actuating rod 30, the link 32 and the valve member 80 will take the position shown by the solid lines in FIG. 1B under the force of the spring 46, thereby permitting the flow of water from the main conduit portion 10a through the housing 12 and the main conduit portion 10b as shown.

When it is desired to close the valve for the purpose of preventing the above-mentioned flow of water, the handle 50 is initially pivoted upwardly relative to the yoke portion 54 into a position approximately shown in FIG. 3, whereby the camming lever 60 engages the lower cam 34 and forces it, as well as the rod 30, downwardly until the latter cam extends immediately below the plane of the rod 70 of the push button assembly 64, as shown by the dashed lines in FIG. 2. The operator then pushes the button 72 from the position shown by the dashed lines to the position shown by the solid lines whereby the end portion of the rod 70 extends immediately over the cam 34 to retain the rod 30 in the position shown in FIG. 3 against the force of the spring 46. It is noted that in this position the valve member 80 is disposed approximately one half way between the cylindrical housing 18 and the inlet conduit 14. With the button 72 being maintained in the depressed condition, the handle 50 can then be returned back to the position shown in FIG. 1A whereby the lever 60 will move to a position extending immediately above the upper cam 36 on the rod 30. The button 72 can then be released and the handle 50 again pivoted upwardly to the position approximately shown in FIG. 4 which forces the cam 36, and therefore the rod 30, downwardly another incremental step to cause the valve member 80 to move to the closed position shown in FIG. 4, corresponding to the position shown by the dashed lines in FIG. 1B.

As a result of the above movement of the valve member 80, the thrust rod 92 will fall downwardly under the force of gravity into enagement with the link 32 at its point of connection with the rod 30 to provide support for the valve member 80 in its flow blocking position.

It is noted that, in the open position of FIG. 1A, a relatively large portion of the actuating rod 30 projects from the top of the cap member 24, while in the closed position of FIG. 4 a relatively small portion projects from the latter member. This, of course, provides a visual indication of whether or not water is actually flowing through the conduit portions 10a and 10b.

It can be appreciated that, in order to maintain the valve member 80 in the closed position, the operator must manually apply a force sufficient to maintain the handle 50 in the position shown in FIG. 4, against the force exerted by the spring 46. When it is desired to open the valve member 80, the operator simply has to release the handle 50 whereby the spring will urge the actuating rod 20 upwardly until it, the valve member, the link 32, the handle 50 and the lever 60 move to their respective positions shown in FIG. 1B.

The handle 52 and its corresponding actuating lever 62 are provided only for failsafe operation, i.e., in situations in which the mechanism becomes jammed, or the like, to the extent that release of the handle 50 when in the position of FIG. 4 will not result in the valve member 80 moving to the open position of FIGS. 1A and 1B under the force of the spring 46. In particular, the handle 52 can be pivoted upwardly from its normal position of FIG. 1A to the position shown by the dashed lines in FIG. 4 whereby the enlarged end portion 62a will ride underneath the cam 36. Then the handle 52 can be pivoted downwardly which will force the cam 36 and therefore the actuating rod 30 upwardly to force the valve member 80 to its open position of FIG. 1B.

It is thus seen that the arrangement of the present invention requires a monitored continuous, manually applied input to maintain the valve member 80 in its closed position during the time in which flow is to be terminated. However, when the monitored continuous energy input is terminated, the valve member 80 will move to its open position under a force provided by the spring 46 to insure that the system in which the valve is incorporated is operable.

Figure 5:
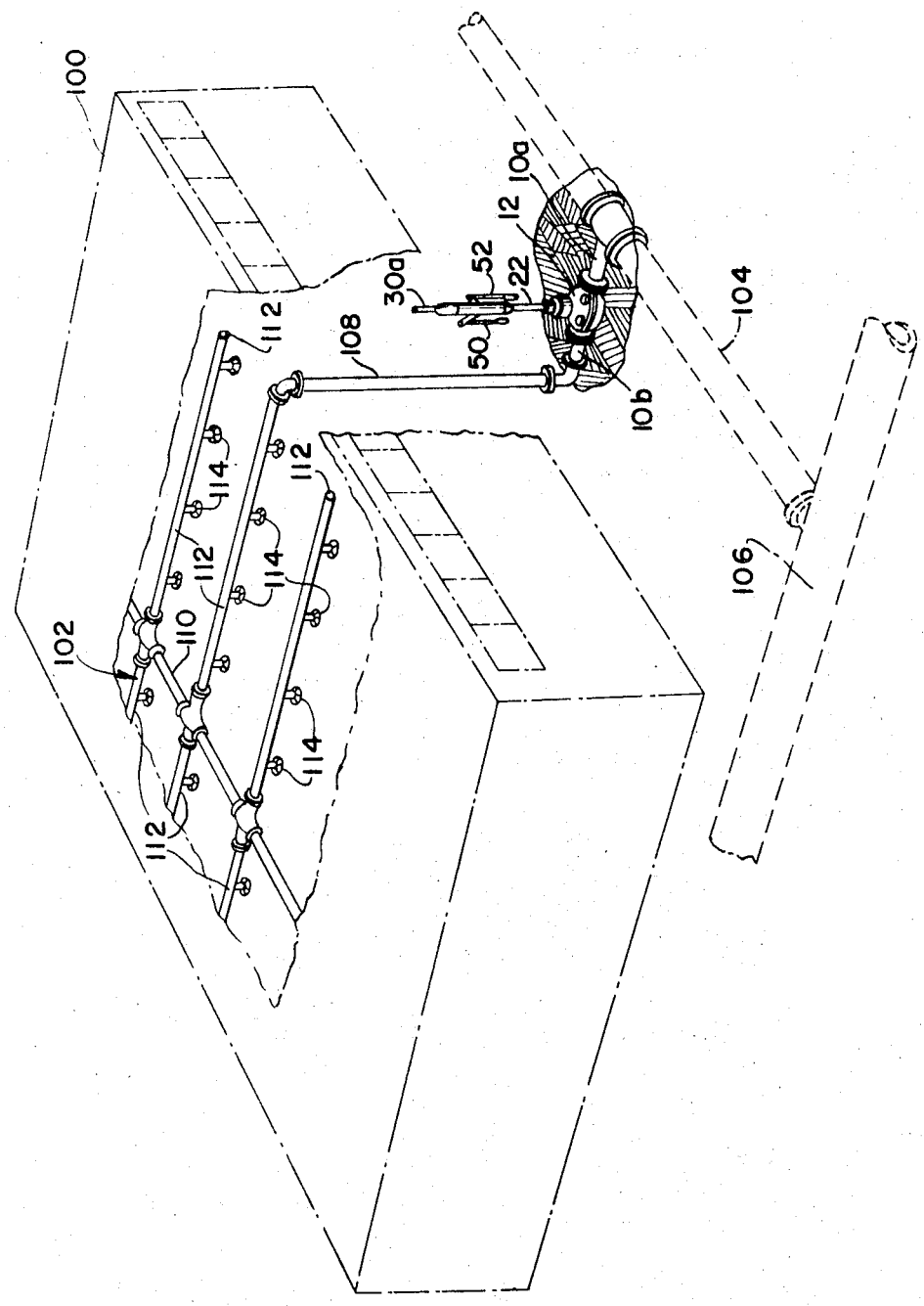
FIG. 5 is a schematic perspective view of a fire protection system installed in a building, and a conduit system incorporating the apparatus of the present invention for supplying water to the fire protection system.

FIG. 5 depicts the apparatus of the present invention installed to control the flow of water to a fire protection system. In particular, a building 100 is shown in phantom lines which is equipped with an automatic fixed fire protection system 102 supplied with water by a conduit system including a buried feed main 104 connected to a buried municipal water supply line 196 for delivering the water to a riser 108 via the conduit portions 10a and 10b, The riser 108 is connected to a crossmain 110 which, in turn, is connected to a plurality of branch lines 112 with the crossmain and the branch lines being suspended near the ceiling of the building in a conventional manner. Each branch line 112 has a plurality of sprinkler heads 114 mounted thereon which are operated automatically in response to a fire, in a conventional manner, to deliver sprays of water to the fire. The housing 12 of the apparatus of the present invention is connected between the conduit portions 10a and 10b, thus permitting the control of water flow to the riser 108, in the manner described above.

This, of course, insures that the fire protection system will remain operable at all desired times, despite the fact that a workman may possibly forget to open the valve after having previously closed it.

Of course, other variations of the specific construction and arrangement of the apparatus and system dislcosed above can be made by those skilled in the art without departing from the invention as defined in the appended claims.

I claim:

1. A fire protection system comprising a plurality of discharge heads mounted in an elevated position in the space to be protected, an underground supply conduit for supplying extinguishant to said heads, a housing having an inlet and outlet registering with said supply conduit under ground, valve means disposed in said housing, actuating means operatively connected to said valve means for moving same between an open position in which extinguishant flow is permitted through said housing and a closed position in which extinguishant flow through said housing is prevented, a portion of said actuating means extending above ground, and resilient means engaging one of said means for normally urging said valve means to said open position to require a continuous manually applied energy input to said portion of said actuating means to move said valve means to said closed position.

2. The system of claim 1 wherein said actuating means includes a linkage operatively connected to said valve means, and handle means adapted to engage said linkage for moving said valve means to said closed position.

3. The system of claim 2 further comprising additional handle means adapted to engage said linkage for moving said valve means from said closed position to said open position in the event said resilient means fails to move said valve means to said open position.

4. The system of claim 2 further comprising an additional housing enclosing said linkage, a portion of said additional housing extending above ground, said linkage being movable relative to said additional housing in response to movement of said valve means with a relatively large portion of said linkage being adapted to project outwardly from said portion of said additional housing when said valve means is in one of said positions and a relatively small portion of said linkage being adapted to project outwardly from said portion of said housing when said valve means is in the other of said positions to provide a visual indication of the position of said valve means.

5. The system of claim 1 further comprising an additional housing enclosing said actuating means and having a portion extending in said first housing, said valve means being adapted to seal off said additional housing when in said open position.

6. The system of claim 1 further comprising support means for supporting said valve means in said closed position against the force of said fluid.

* * * * *